United States Patent [19]

Hirata et al.

[11] Patent Number: 4,976,462
[45] Date of Patent: Dec. 11, 1990

[54] WATER COOLING MEANS FOR ENGINE

[75] Inventors: Akira Hirata, Shizuoka; Iwao Masumoto, Shimada, both of Japan

[73] Assignee: Yamaha Hatsudoki Kabushiki Kaisha, Iwata, Japan

[21] Appl. No.: 27,786

[22] Filed: Mar. 19, 1987

[30] Foreign Application Priority Data

Mar. 20, 1986 [JP] Japan ................................ 61-62092

[51] Int. Cl.[5] ............................................. F01P 7/02
[52] U.S. Cl. .................................... 236/345; 251/126
[58] Field of Search ................ 251/126; 236/34.5, 34, 236/100

[56] References Cited

U.S. PATENT DOCUMENTS

| 2,598,187 | 5/1952 | Meyer | 251/126 |
| 2,982,477 | 5/1961 | Drapeau | 236/34.5 |
| 3,854,468 | 12/1974 | Nozaki | 126/113 |
| 4,506,423 | 3/1985 | Nakamura et al. | 251/126 X |

FOREIGN PATENT DOCUMENTS 428487  12/1947  Italy ..................................... 251/126

Primary Examiner—William E. Tapolcai
Attorney, Agent, or Firm—Ernest A. Beutler

[57] ABSTRACT

An improved thermostat arrangement for an internal combustion engine and an associated cooling system for the engine. The thermostat is designed so as to introduce a swirl in the thermostat housing to reduce pulsations in the coolant. In addition, the engine disclosed has its cooling jacket in such a way that the water pump is at one end of the engine and the thermostat is at the other end of the engine so as to facilitate transverse mounting of the engine.

10 Claims, 2 Drawing Sheets

4,976,462

WATER COOLING MEANS FOR ENGINE

BACKGROUND OF THE INVENTION

This invention relates to a water cooling means for an engine and more particularly to an improved thermostat arrangement and cooling layout for an internal combustion engine.

As is well known, with liquid cooled internal combustion engines, it is the normal practice to provide a thermostat within the cooling system for maintaining a uniform temperature and for insuring quick warm-up. The thermostat includes a thermostatically operated valve element that causes the coolant to be recirculated through the engine cooling jacket without flowing through the associated radiator when the engine is cold. As the temperature of the engine increases, the thermostatic valve progressively opens and increasing amounts of coolant are circulated through the radiator before they are returned to the engine cooling jacket for recirculation.

It has been found that a particular problem results from such arrangements. Specifically, the water that enters the thermostat housing has pulsations in it and if the thermostatic valve is partially opened, these pulsations are transmitted through the thermostat housing back into the engine cooling system. Not only does this cause uneven coolant flow but it also can cause vibrations to occur in the thermostat housing, connecting pipes and the radiator. Obviously, these vibrations can adversely affect the durability of all of the components of the engine associated with the cooling jacket and particularly the radiator, piping and clamps not to mention the thermostat itself.

In a V type engine, the two banks of the engines normally have their own separate cooling jackets which operate independent but which return the coolant to the radiator through the same thermostat housing. With such types of engines, the problems described in the preceding paragraph may be even more prevalent.

It is, therefore, a principal object of this invention to provide an improved cooling system for an internal combustion engine.

It is a further object of this invention to provide an improved cooling system for an internal combustion engine in which vibrations in the cooling system and specifically in the thermostat housing are avoided.

It has been the practice to mount both the thermostat and the water pump at the same end of the engine. This facilitates the driving of the water pump without necessitating external shafting and also can provide a relatively compact nature for the engine. However, the water inlet from the radiator back to the engine normally extends into the water pump housing and the water return back to the radiator normally extends from the thermostat housing. This means that the engine water inlets and outlets are positioned in close proximity to each other. Although in some applications this is desirable, there are others where this is not true.

For example, if the radiator or associated heat exchanger is disposed in parallel sid-by-side relationship to the engine as is common with transverse engine, front wheel drive arrangements, the plumbing for the radiator can be complicated or, alternatively, it is necessary to use a vertical flow rather than a cross flow radiator. In addition, the positioning of both the water pump and the thermostat at the same end of the engine can give rise to certain servicing problems.

It is, therefore, a still further object of this invention to provide an improved cooling system for an internal combustion engine.

It is a further object of this invention to provide a cooling system for an internal combustion engine wherein the water pump and thermostat housing may be positioned at widely different locations relative to the associated engine.

SUMMARY OF THE INVENTION

A first feature of the invention is adapted to be embodied in a thermostat arrangement for an internal combustion engine having an outer housing defining an internal cavity. A thermostatic valve is contained within the outer housing and defines first and second portions. The thermostatic valve is movable between a closed position wherein the communication between the housing portions is restricted, and an opened position wherein the portions have substantially unrestricted communication. An inlet port extends into one of the housing portions and an outlet port opens into another of the housing portions. At least one of the ports is configured relative to the associated housing portion for generating a swirl around the thermostat for precluding the transmission of pulsations through the thermostat housing.

Another feature of the invention is adapted to be embodied in a cooling system for an internal combustion engine having a cylinder construction which incorporates a cooling jacket having an inlet port at one end of the engine and an outlet port at the other end of the engine. A water pump is driven by the engine and is located at a first end thereof and is associated with the port at that end. A thermostat housing containing a thermostat is positioned at a second end of the engine and is associated with the port at that end.

DETAILED DESCRIPTION OF THE PREFERRED EMBODIMENT

Figure 1:
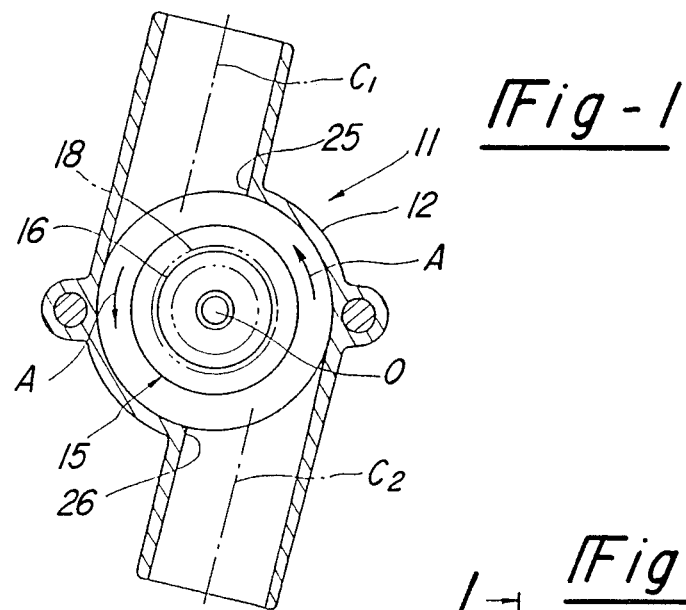
FIG. 1 is a cross-sectional view taken along the line 1—1 of FIG. 2 and shows a thermostat housing constructed in accordance with an embodiment of the invention.
Figure 2:
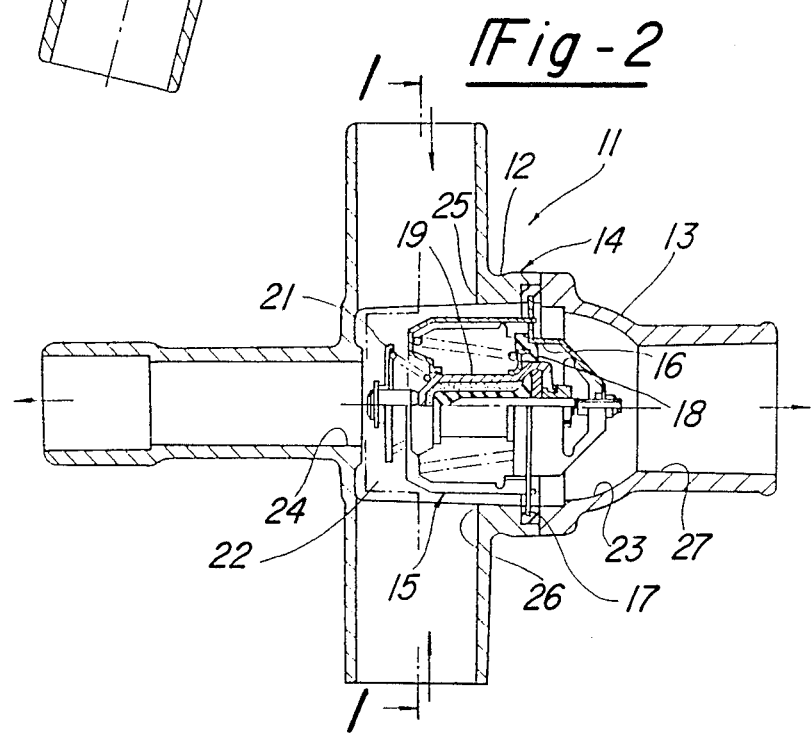
FIG. 2 is a cross-sectional view taken along a plane extending generally perpendicularly to the plane of FIG. 1.

Referring first to FIGS. 1 and 2, a thermostat constructed in accordance with an embodiment of the invention is identified generally by the reference numeral 11. The thermostat is particularly adapted for use with the cooling system of a liquid cooled internal combustion engine and particularly one of the type having inclined or angularly disposed cylinder banks.

The thermostat 11 includes an outer housing that is comprised of a main body portion 12 and a cover plate 13. The cover plate 13 and main body port 12 are affixed to each other in any known manner. The overall thermostat housing is indicated generally by the reference numeral 14.

An internal cavity is defined within the thermostat housing 14 and supports a thermostatic valve, indicated generally by reference numeral 15. The thermostatic valve 15 may be of any known type and it includes an outer housing 16 that has a peripheral flange 17 so as to be clampingly engaged between the thermostat housing portion 12 and the cover plate 13.

The housing 16 of the thermostatic valve 15 also defines a valve seat with which a movable valve element 18 cooperates. The movable valve element 18 is actuated by means of a thermostatically operable pellet 19 that is supported within the outer housing 16 of the thermostat by means including a mounting post 21. When the valve element 18 is in its closed position, communication between a first inlet part 22 of the thermostat housing 14 and a second outlet part 23 is precluded. The thermostatic element 19 is disposed within the part 22, as is well known in this art, so that it will sense the coolant temperature and will open the valve element 18 as the engine coolant becomes heated. When the valve 18 begins to open, coolant may flow between the parts 22 and 23. As has been noted, the construction of the thermostatic valve 15 forms no part of the invention and any of the known valves may be utilized in combination with the invention.

The thermostat housing 14 and specifically the main body port 12 is provided with a bypass return port 24 that extends in a generally axial direction with respect to the housing cavity portions 22 and 23. In addition, there are provided a pair of coolant inlet ports 25 and 26 which communicate with the part 22 in a manner to be described.

It should be noted that the inlet ports 25 and 26 are generally cylindrical in configuration and have their respective axis $C_1$ and $C_2$ disposed at an angle to a central axis O of the thermostat housing portion 22. As a result, when coolant is delivered to the thermostat housing portion 22 from the inlet ports 25 and 26, there will be a swirling motion occur as indicated by the arrows A. This swirling motion causes a swirling flow around the thermostatic element 19 and has been found to substantially reduce pulsations in the fluid system. As a result, there will be little, if any, pulsations delivered to the cooling system and the aforenoted deleterious effects will be avoided.

When the thermostatic valve 15 is closed, as has been noted, the coolant will be returned to the engine coolant jacket through the bypass port 24. However, as the thermostatic valve 15 progressively opens, the coolant will be delivered to a heat exchanger through a coolant outlet port 27 that is formed in the cover plate 13.

Figure 3:
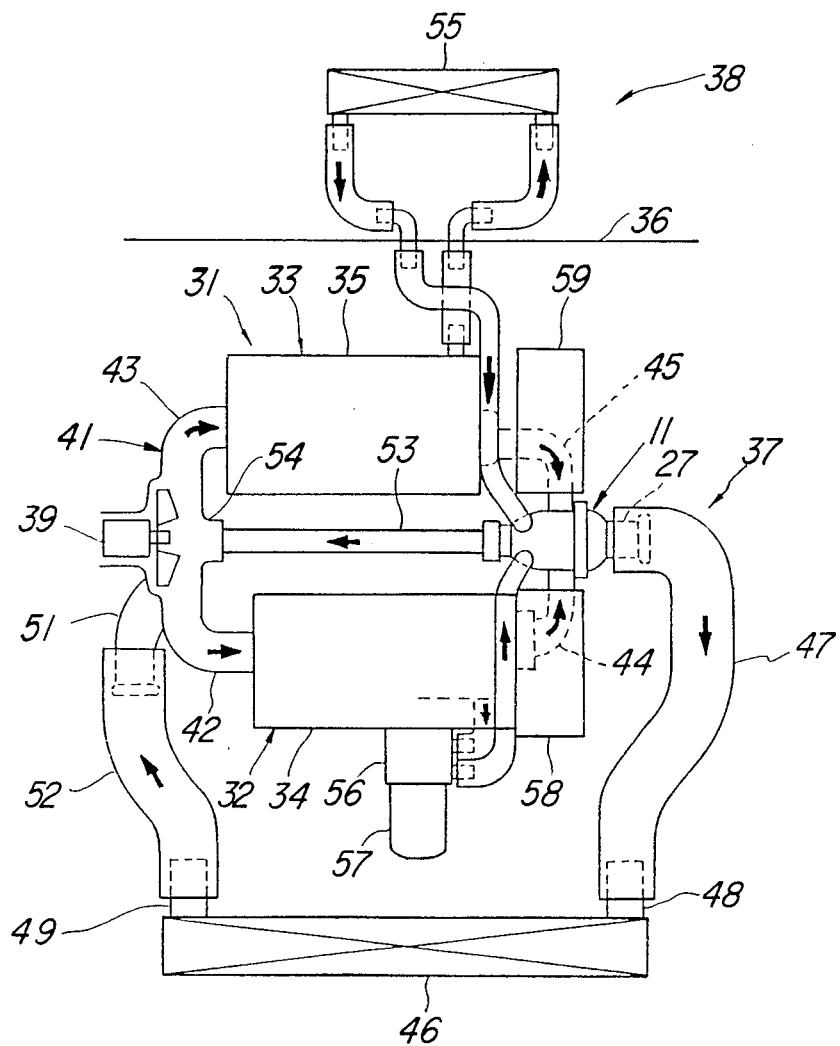
FIG. 3 is a partially schematic top plan view of a motor vehicle incorporating an internal combustion engine having a cooling system constructed in accordance with an embodiment of the invention and incorporating a thermostat of the type shown in FIGS. 1 and 2.

FIG. 3 shows an application as to how the thermostat assembly 11 may be employed in connection with a motor vehicle. In the illustrated embodiment, the motor vehicle is of the transverse engine, front wheel drive type, although, as is well known, the same principle may be applied to a transverse engine, mid engine or rear engine, rear wheel drive vehicle. The engine is identified generally by the reference numeral 31 and is depicted of the V type having cylinder banks 32 and 33 that are disposed at an angle to each other. These cylinder banks include cylinder blocks which are not shown and associated cylinder heads 34 and 35.

In accordance with the aforedescribed application for the engine, the cylinder banks 32 and 33 extend transversely to the longitudinal axis of the associated vehicle, which vehicle has a fire wall 36 that divides the engine compartment 37 from a passenger compartment 38. The output shaft of the engine 31 rotates about a transverse axis to the longitudinal axis of the vehicle.

In accordance with the invention, an engine driven water pump 39 is positioned at one end of the engine. The water pump 39 discharges through a water pump housing 41 that has a pair of branch passages 42 and 43 that deliver the engine coolant to the cylinder heads 34 and 35, respectively. The cylinders heads 34 and 35 and cylinder blocks of each of the banks 32 and 33 have appropriate water jacketing. After circulation through the appropriate water jackets, the coolant is delivered to the housing 14 of the thermostat 11, which has a configuration as in FIGS. 1 and 2, as previously noted, through water return pipes 44 and 45. The water return pipes 44 and 45 feed into the inlet ports 25 and 26 of the thermostat housing so as to create the aforedescribed swirl condition.

A radiator or other heat exchanger 46 is positioned within the engine compartment 37 transversely to the longitudinal center line of the vehicle and in side-by-side relationship to the engine 31. A return hose 47 is connected between the thermostat housing outlet 27 and a radiator inlet 48 for delivering coolant to the radiator 46 when the thermostatic valve is opened.

The radiator 46 is of the cross flow type and has a return outlet 49 from which coolant is delivered to an inlet 51 of the water pump housing 41 by means of a flexible conduit 52.

A bypass line 53 also extends to a bypass fitting 54 of the water pump housing 41 from the housing of the thermostat and specifically its bypass port 24. The bypass line 53 may run longitudinally of the engine in the valley between the banks of cylinders 32 and 33.

Coolant may be delivered to a heater core 55 that is positioned within the passenger compartment 38 by mean of appropriate conduits extending from the cylinder bank 33. This coolant is returned to the thermostat housing either through a separate return line or through the fitting 45.

In a similar manner, an oil radiator 56 may be associated with an oil filter 57 carried by the cylinder bank 32 for cooling the engine oil. This coolant is also delivered to the thermostat housing 11 by means of a suitable conduit or through the fitting 44.

In the illustrated embodiment, the engine 31 is depicted as having overhead mounted camshafts and these camshafts are driven by timing belts contained within timing belt covers indicated by the boxes 58 and 59.

It should be readily apparent from the foregoing description that a highly effective thermostat housing is provided for an engine cooling system that will insure against pulsations in the cooling jacket. In addition, an improved layout is provided for the components of the cooling system consisting of the water pump and thermostat housing that are particularly useful in transverse engine placements. Although an embodiment of the invention has been illustrated and described, various changes and modifications may be made without departing from the spirit and scope of the invention, as defined by the appended claims.

What is claimed is:

1. A thermostat arrangement for an internal combustion engine having an outer housing defining an internal cavity, a thermostatic valve contained within said outer housing and defining first and second portions of said internal cavity, said thermostatic valve being movable along an axis between a closed position wherein communication between said portions is restricted and an open position wherein said portions have substantially unrestricted communication, an inlet port extending into one of said housing portions, and an outlet port opening into another of said housing portions, at least one of said ports being configured relative to its associated housing portion and to the axis of said thermostatic valve for direction the flow of coolant against said thermostatic valve for generating a swirl circumferentially around said axis of said thermostatic valve for precluding the transmissions of pulsations through said outer housing to the associated cooling system.

2. A thermostat arrangement as set forth in claim 1 wherein the one port comprises an inlet port and further including a bypass port extending from said one portion back to the associated cooling system.

3. A thermostat arrangement as set forth in claim 2 wherein there are a pair of inlet ports each disposed relative to the first housing portion to generate a swirl.

4. A thermostat arrangement for an internal combustion engine having an outer housing defining an internal cavity, a thermostatic valve contained within said outer housing and defining first and second portions of said internal cavity, said thermostatic valve being movable between a closed position wherein communication between said portions is restricted and an open position wherein said portions have substantially unrestricted communication, an inlet port extending into one of said housing portions, at least one of said ports being configured relative to its associated housing portion for directing the flow of coolant against said thermostatic valve for generating a swirl around said thermostatic valve for precluding the transmission of pulsations through said outer housing to the associated cooling system, said one housing portion being generally cylindrical in configuration and the one port is offset to one side of the cylinder from its axis for generating the swirl.

5. A thermostat arrangement as set forth in claim 4 wherein there are a pair of ports each offset to opposite sides of the axis.

6. A thermostat arrangement as set forth in claim 5 wherein the engine has a pair of cylinder banks each delivering fluid to a respective one of the inlet ports.

7. A thermostat arrangement as set forth in claim 6 wherein the engine is of the V type.

8. A thermostat arrangement as set forth in claim 7 further including a water pump disposed at the end of the engine opposite to the thermostat housing.

9. A thermostat arrangement as set forth in claim 8 wherein the bypass line returns to the water pump along the length of the engine.

10. A thermostat arrangement as set forth in claim 9 wherein the thermostat has its temperature responsive element positioned within the one portion.

* * * * *